United States Patent [19]

Crone

[11] 4,275,868
[45] Jun. 30, 1981

[54] VALVE WITH BODY AND STEM OF PLASTIC MATERIAL

[75] Inventor: Jerry L. Crone, Paris, Ill.

[73] Assignee: Unarco Industries, Inc., Chicago, Ill.

[21] Appl. No.: 964,618

[22] Filed: Nov. 29, 1978

Related U.S. Application Data

[63] Continuation of Ser. No. 794,727, May 9, 1977, abandoned.

[51] Int. Cl.³ ............................................. F16K 5/00
[52] U.S. Cl. ................................. 251/310; 251/317; 251/357; 251/DIG. 1
[58] Field of Search ............... 251/309, 310, 316, 317, 251/357, DIG. 1

[56] References Cited

U.S. PATENT DOCUMENTS

| | | | |
|---|---|---|---|
| 712,679 | 4/1953 | Pensak | 251/309 |
| 2,433,732 | 12/1947 | Brown | 251/309 |
| 2,840,109 | 6/1958 | Wadleigh | 251/310 |
| 2,852,226 | 9/1958 | Wheatley | 251/317 |
| 3,326,519 | 6/1967 | Freed | 251/317 |
| 3,437,310 | 4/1969 | Inch | 251/317 |
| 3,474,818 | 10/1969 | Hartman | 251/317 |
| 3,540,694 | 11/1970 | Cornelius | 251/310 |
| 3,938,553 | 2/1976 | Ortega | 251/DIG. 1 |
| 3,971,402 | 7/1976 | Gallo | 251/309 |
| 4,014,513 | 3/1977 | Bake | 251/317 |

FOREIGN PATENT DOCUMENTS

| | | | |
|---|---|---|---|
| 1959083 | 5/1971 | Fed. Rep. of Germany | 251/310 |
| 1336578 | 10/1962 | France | 251/310 |

Primary Examiner—William R. Cline
Assistant Examiner—H. Jay Spiegel
Attorney, Agent, or Firm—Norman Lettvin

[57] ABSTRACT

A plastic valve assembly includes a body member and a controller member each having alignable transverse flow passageways and constantly aligned longitudinal flow passageways. The controller member is positioned in the body member for rotatably aligning the transverse passageways. Axially spaced about the exterior of the transverse body passageway are a pair of lands and axially spaced about the transverse controller passageway are a pair of resilient seals. A recess completely surrounds the exterior of the transverse controller passageway with a resilient wiper seal seated in the recess. The controller member is so positioned in the body member that the resilient seals constantly and sealingly engage the lands and the wiper seal constantly and sealingly engages the interior wall of the body member surrounding the transverse controller flow passageway.

7 Claims, 2 Drawing Figures

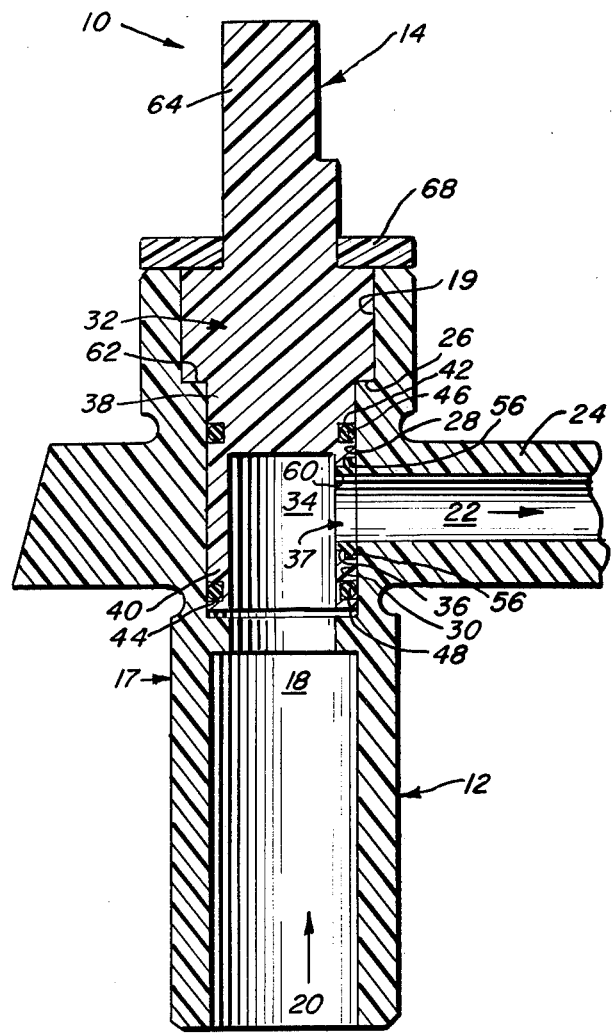
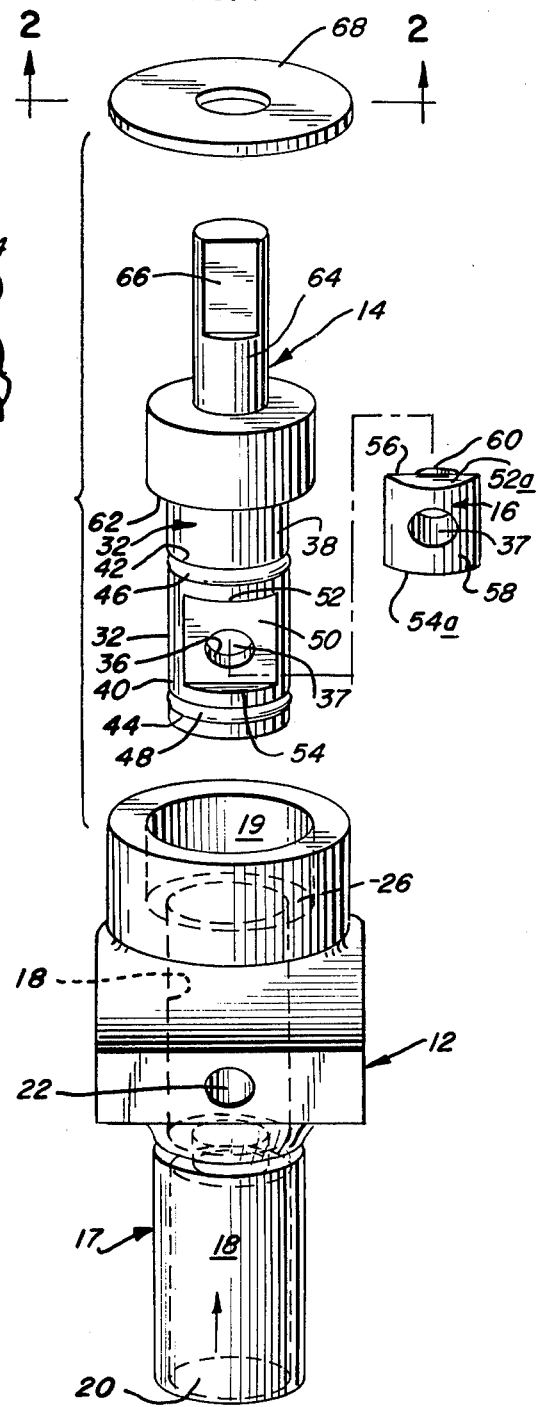

VALVE WITH BODY AND STEM OF PLASTIC MATERIAL

This is a continuation, of application Ser. No. 794,727, filed May 9, 1977, now abandoned.

FIELD OF THE INVENTION

This invention relates to a valve arrangement wherein the stem and the body are constructed of a plastic material and more particularly to a faucet valve utilizing plastic construction and resilient seals to provide inexpensive but reliable operation.

BACKGROUND OF THE INVENTION

It has heretofore been known to employ rubber washers to seal fluid flow through metallic rotary valves. And, although rotary valves have been previously manufactured from plastic, valves of plastic construction utilizing rubber washers have failed to successfully prevent fluid leakage between their operative rotational components. To date washerless plastic rotary valves which successfully contain fluid are not commercially available.

It is therefore one object of this invention to provide a rotary valve that is constructed of molded plastic materials and yet sealed so as to provide reliability, effectiveness of operation, simplicity and yet inexpensiveness of manufacture.

Another object of this invention is to provide a washerless molded plastic rotary valve with resilient seals that successfully prevent fluid leakage between rotational fluid components.

Other objects and advantages of the invention will become apparent from the following description of the preferred embodiment of the invention.

BRIEF SUMMARY OF THE INVENTION

A rotary valve is constructed of molded plastic parts to reduce manufacturing costs. The valve comprises an elongated, tubular body member having an upper controller receiving chamber, a lower flow chamber including a longitudinal flow passageway and a transverse flow passageway communicating with the longitudinal passageway. A controller member also having longitudinal and transverse flow passageways communicatively associated with the longitudinal and transverse body passageways, is received within the receiving chamber of the body member so as to be rotatable about a longitudinal axis. The controller member includes a pair of grooves axially spaced about its transverse flow passageway and a recess completely surrounding the exterior of that passageway. A pair of O-rings seat in the grooves and a wiper seal seats in the recess. When the controller member is positioned within the body member, the O-rings and the wiper seal are compressed inwardly by the interior circular body member walls to form a fluid-tight seal between the rotatable members. Rotation of the controller member relative to the body member brings the transverse flow passageways into and out of alignment. But, regardless of the relative positioning of the transverse flow passageways, the O-rings and seals are maintained in a compressed, sealing attitude against the flow chamber walls.

BRIEF DESCRIPTION OF THE DRAWINGS

FIG. 1 is an exploded perspective view of the controller member, wiper seal, retainer member and body member with the body member showing a cross-section of its transverse flow passageway; and FIG. 2 is a cross-sectional view along line 2—2 of FIG. 1 showing the controller member and seal assembly operatively positioned in an open, fluid flow position within the body member.

DETAILED DESCRIPTION OF THE DRAWINGS

Referring now to the drawings, the improved rotary valve of this invention is shown generally at 10 in FIGS. 1 and 2. The operative elements of the valve include a body member 12, a controller member 14 and a wiper seal 16.

More particularly, the body member 12 is of plastic construction and includes a longitudinally elongated hollow shell 17 defining a lower elongated cylindrical flow chamber 18 and an upper receiver chamber 19. The interior of the flow chamber 18 provides a first longitudinal flow passageway 20. A transverse flow passageway 22 is formed in the interior of tubular body extension 24, adapted to selectively communicate, through controller 14, with flow in the upper end of the flow chamber 18, there being an interior constriction 18a as shown in chamber 18 and above which the flow controller member 14 is located.

The upper receiver chamber 19 includes an integral, internal annular bearing shoulder 26. In the flow chamber 18 and axially spaced about the transverse flow passageway 22 are a pair of continuous, interior cylindrical lands 28 and 30.

A controller member 14, also of plastic construction, includes at its lowermost end an elongated flow plug 32. In FIG. 2, the controller member 14 is telescoped into body member 12 with the extended, or lowermost plug end 32 in flow chamber 18, and with another portion in receiver chamber 19. The lower interior of the flow plug 32 is hollowed to form a longitudinal controller flow passageway 34. An opening 36 in the tubular flow plug wall communicates with the longitudinal controller flow passageway 34 to form a transverse controller flow passageway 37.

Axially spaced about the exterior of the transverse controller flow passageway 37 are a pair of continuous cylindrical portions 38 and 40, each with a peripheral groove 42 and 44 therein. Seated within each of the peripheral grooves 42 and 44 are resilient O-rings 46 and 48 adapted to seal against an adjacent cylindrical land 28 and 30 respectively while permitting relative rotation between the body and controller members.

A recess 50 is defined on the exterior of the flow plug 32 completely surrounding the lateral opening 36 of the transverse controller flow passageway 37. The recess 50 is of channel-shaped cross-section with the web of the channel surrounding the lateral opening 36 in the wall of the flow plug 32. The channel is defined by spaced, parallel legs 52 and 54 forming chordal sections of the outer cylindrical plug surface and the curvature of the controller flow plug 32.

Seated within the recess 50 is a wiper seal 16 which is of a dimension to sealingly engage the wall of the cylindrical flow chamber 18 that surrounds the transverse body flow passageway 22 of the body member 12 when the controller member 14 is positioned within the body member 12. The wiper seal 16 includes a planar interior surface 56, and spaced edges 52a and 54a, respectively adapted to seat against the web of the recess 50 and against channel legs 52 and 54. The outer face 58 of the wiper seal 16 is shaped in the form of a cylindrical arc of a radius corresponding substantially to the radius of curvature of the cylindrical flow chamber 18 to effect sealing therewith. A tubular stud 60 projects from the flat interior wiper seal surface 56 and enters the lateral opening 36 in the flow plug 32.

A cylindrical bearing shoulder 62 is formed at the upper end of the controller member 14 above the upper axial groove 42. Extending upwardly from the top surface of bearing shoulder 62 is an upright dowel 64 having an upper portion 66 of flatted or D-shaped cross-section adapted to receive a control handle (not shown). A retainer member 68 and a standard valve nut (not shown) secure the controller member 14 to the body member 12.

In operation the controller member is frictionally but rotatably received within the receiver chamber by push-fit assembly such that the oppositely facing controller and body member shoulders 62 and 26 provide a rotary bearing between the two members. The shoulders further serve as a means to axially align the transverse body flow passageway 22 and the transverse controller flow passageway 37 and to properly position the wiper seal 16 and O-rings 46 and 48 within the cylindrical flow chamber 18. In this position the O-rings and wiper seal are compressed by the interior flow chamber walls to form a fluid-tight seal.

Fluid is normally held within the flow chamber of the body member. When a handle secured to the D-shaped dowel is turned to rotate the transverse flow passageway 37 of the controller member into alignment with the transverse flow passageway 22 of the body member, the pressurized fluid is forced through the passageways. The combination of the O-rings and wiper seal effectively prevent fluid from seeping between the body and controller members. When the handle is again turned, the controller member is rotated to partially align or completely non-align the transverse flow passageways.

Note that regardless of the rotational positioning of the controller member, the O-rings and wiper seal are inwardly compressed as they bear against the inner cylindrical surface of the fluid chamber 18 of the body member, thereby constantly maintaining a fluid-tight seal.

Although not shown, stops, limiting rotational movement of the controller member, may be included without compromising overall valve performance. The body, controller and stem may be constructed from any non-hydroscopic hydrocarbon material and are preferably injection molded. Examples of acceptable non-hydroscopic hydrocarbon materials are Delrin $^R$100 and Delrin $^R$500. The plastic valve of this invention, although not limited to faucet valves, may be readily incorporated in standard two-handle, four-and-eight-inch centers, or single-top faucets. The wiper and O-rings are fabricated from an appropriate elastomeric material such as synthetic rubber.

While there has been disclosed one form of the invention, it will be understood that the invention may be utilized in other forms and environments, so that the purpose of the appended claims is to cover all such forms of devices not disclosed but which embody the invention disclosed herein.

What is claimed is:

1. In a two-element valve member for liquid under pressure that includes: a body member as one element with an elongated flow chamber therein; a rotatable controller member as the second element with an elongated cylindrical flow plug of a size adapted for positioning within said flow chamber; there being inlet and outlet flow openings including a lateral flow opening in said body member, and inlet and outlet flow openings including a lateral flow opening in said flow plug, such that the lateral flow openings of said plug and body member may be selectively positioned in a flow relationship or a no-flow relationship to each other, upon effecting rotational movement of the second element relative to said first element;

the improvement comprising, in combination: at least one of said members being formed of plastic; a pair of longitudinally spaced, cylindrical, circumferential lands defined on one of said members, a pair of longitudinally spaced circumferential seals being provided on the other member and adapted for engagement with said lands, to provide spaced rotational seals, between said members in the flow chamber, located on opposite sides of said lateral flow openings and operative to prevent leakage therepast of liquid under pressure;

a recess defined in the exterior of said rotatable cylindrical flow plug, said recess being of channel-shaped cross-section and extending chordally of the cylindrical flow plug with the web of the channel-shaped recess being flat and intersecting and completely surrounding a terminus of said lateral flow opening therein, a wiper seal positioned in said recess and being of a size and shape to provide a planar interior surface to engage said web of the channel-shaped recess in the flow plug to surround and bound said terminus of said lateral opening in the flow plug and being of a dimension to sealingly engage both the portions of the recess that surround and define the terminus of the lateral flow opening in the flow plug and the annular wall portions of the cylindrical flow chamber that surround the lateral flow opening in said body member when the two said lateral flow passageways are aligned in a flow relationship, and to sealingly engage against an annular wall portion of the cylindrical flow chamber that is adjacent but circumferentially offset from the lateral flow opening in said body member when the two said lateral flow passageways are in a no-flow relationship, so that no flow will pass through the lateral flow openings in the flow plug and the body member.

2. A valve as in claim 1 wherein the body member defines a tubular receiver for receiving thereinto, by axial push-fit assembly, the controller member; and holding means including a retainer member separate from the body member and the controller member and operatively associated with said two members for holding the members assembled.

3. A valve as in claim 2 wherein the holding means includes cooperating oppositely facing bearing shoulders on the two members which provide a rotary bearing between the two members, and also serve as a locating means for properly positioning the wiper seal and O-rings within the cylindrical flow chamber.

4. In a valve member for liquid under pressure that includes: a body member with an elongated flow chamber therein; a controller member with an elongated flow plug of a size adapted for positioning within said flow chamber; there being inlet and outlet flow openings including a lateral flow opening in said body member, and inlet and outlet flow openings including a lateral flow opening in said flow plug, such that the lateral flow openings of said plug and body member may be selectively positioned in a flow relationship or a no-flow relationship to each other, upon effecting a relative rotational movement between said members;

the improvement comprising, in combination: at least one of said members being formed of plastic; a pair of longitudinally spaced, cylindrical, circumferential lands defined on one of said members, a pair of longitudinally spaced circumferential seals being provided on the other member and adapted for engagement with said lands, to provide spaced rotational seals, between said members in the flow chamber, located on opposite sides of said lateral flow openings and operative to prevent leakage therepast of liquid under pressure;

a recess defined in the exterior of said flow plug and completely surrounding said lateral flow opening therein, a wiper seal positioned in said recess surrounding said lateral opening in the flow plug and being of a dimension to sealingly engage annular wall portions of the cylindrical flow chamber that surround the lateral flow opening in said body member when the two said lateral flow passageways are aligned in a flow relationship, and to sealingly engage against an annular wall portion of the cylindrical flow chamber that is adjacent but circumferentially offset from the lateral flow opening in said body member when the two said lateral flow passageways are in a no-flow relationship, so that no flow will pass through the lateral flow openings in the flow plug and the body member, the recess defined on the flow plug being of channel-shaped cross-section with the web of the channel surrounding the lateral opening through the flow plug, and the wiper seal including a tubular stud that enters the lateral opening in the flow plug.

5. A valve as in claim 4 wherein the body member defines a tubular receiver for receiving the controller member thereinto by axial push-fit assembly; and holding means operatively associated with the two members for holding the members assembled.

6. A valve as in claim 5 wherein the holding means includes cooperating oppositely facing bearing shoulders on the two members which provide a rotary bearing between the two members, and also serve as a locating means for properly positioning the wiper seal and O-rings within the cylindrical flow chamber.

7. In a valve member for liquid under pressure that includes: a body member with an elongated flow chamber therein; a controller member with an elongated flow plug of a size adapted for positioning within said flow chamber; there being inlet and outlet flow openings including a lateral flow opening in said body member, and inlet and outlet flow openings including a lateral flow opening in said flow plug, such that the lateral flow openings of said plug and body member may be selectively positioned in a flow relationship or a no-flow relationship to each other, upon effecting a relative rotational movement between said members;

the improvement comprising, in combination: at least one of said members being formed of plastic; a pair of longitudinally spaced, cylindrical, circumferential lands defined on one of said members, a pair of longitudinally spaced circumferential seals being provided on the other member and adapted for engagement with said lands, to provide spaced rotational seals, between said members in the flow chamber, located on opposite sides of said lateral flow openings and operative to prevent leakage therepast of liquid under pressure;

a recess defined in the exterior of said flow plug and completely surrounding said lateral flow opening therein, a wiper seal positioned in said recess surrounding said lateral opening in the flow plug and being of a dimension to sealingly engage annular wall portions of the cylindrical flow chamber that surround the lateral flow opening in said body member when the two said lateral flow passageways are aligned in a flow relationship, and to sealingly engage against an annular wall portion of the cylindrical flow chamber that is adjacent but circumferentially offset from the lateral flow opening in said body member when the two said lateral flow passageways are in a no-flow relationship, so that no flow will pass through the lateral flow openings in the flow plug and the body member, the recess defined on the flow plug being of channel-shaped cross-section with the web of the channel surrounding the lateral opening through the flow plug, and the wiper seal being seated against the web of the channel, and the outer face of the seal being in the form of a cylindrical arc of radius corresponding substantially with the radius of curvature of the cylindrical flow chamber to effect sealing therewith.

* * * * *